March 19, 1963 E. D. WILKERSON 3,081,546
WHEEL ALIGNMENT TESTING MEANS AND METHOD
Filed March 9, 1955 3 Sheets-Sheet 1
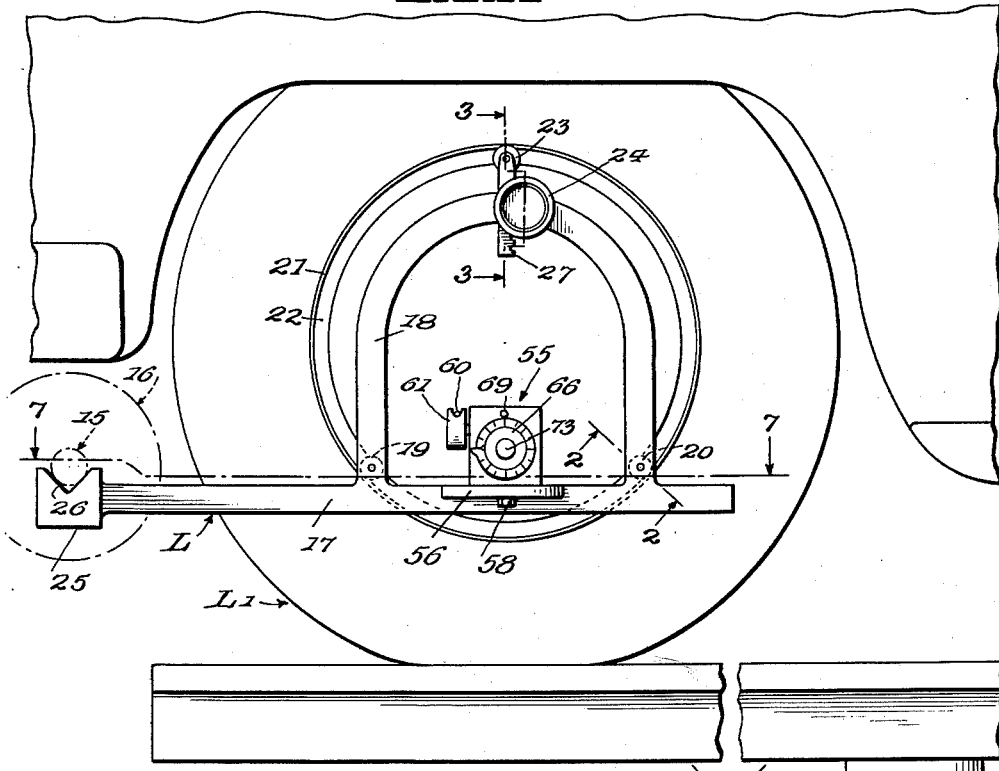
INVENTOR.
Edward D. Wilkerson
BY

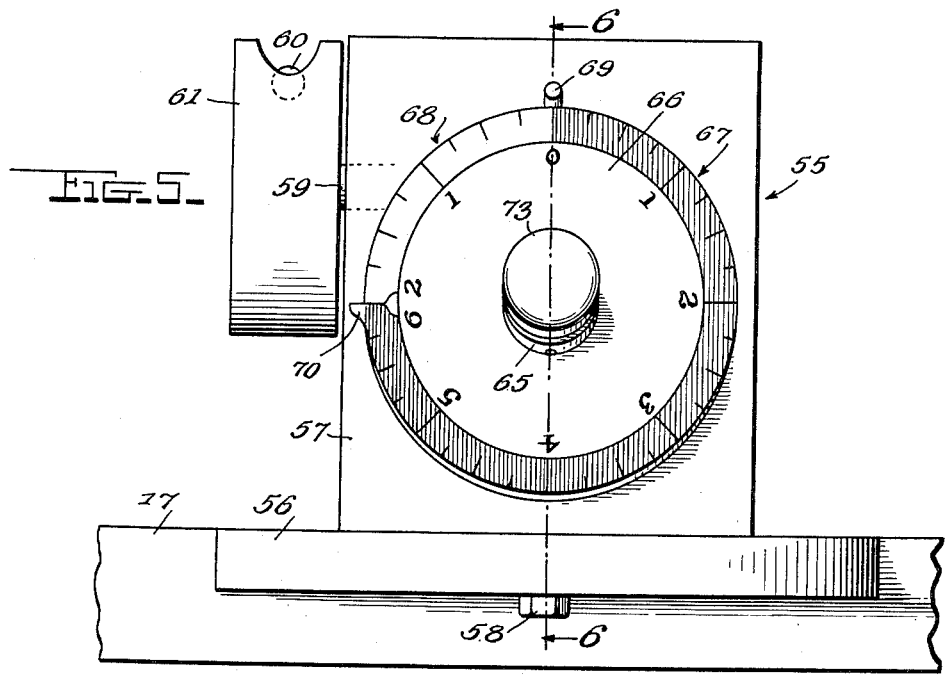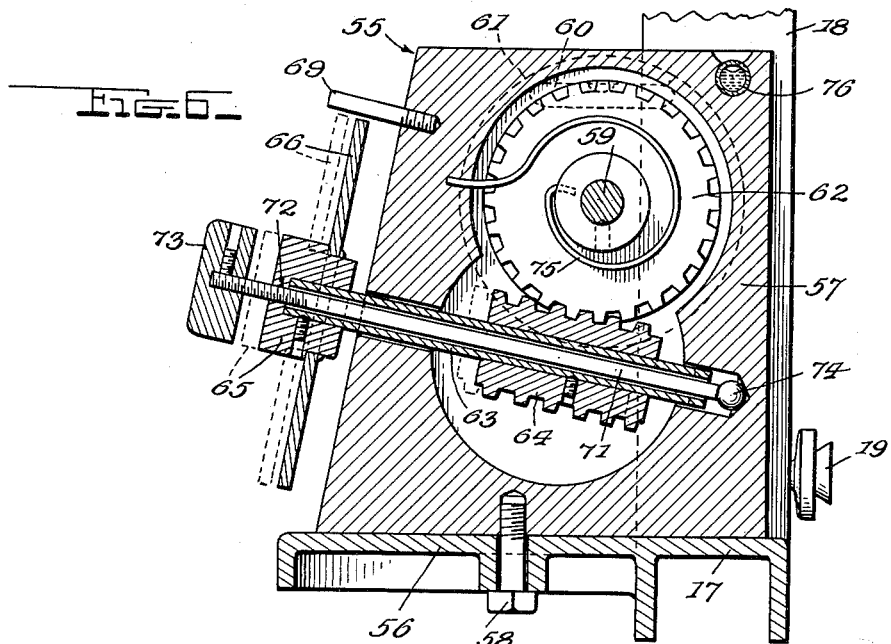

March 19, 1963 E. D. WILKERSON 3,081,546
WHEEL ALIGNMENT TESTING MEANS AND METHOD
Filed March 9, 1955 3 Sheets-Sheet 3
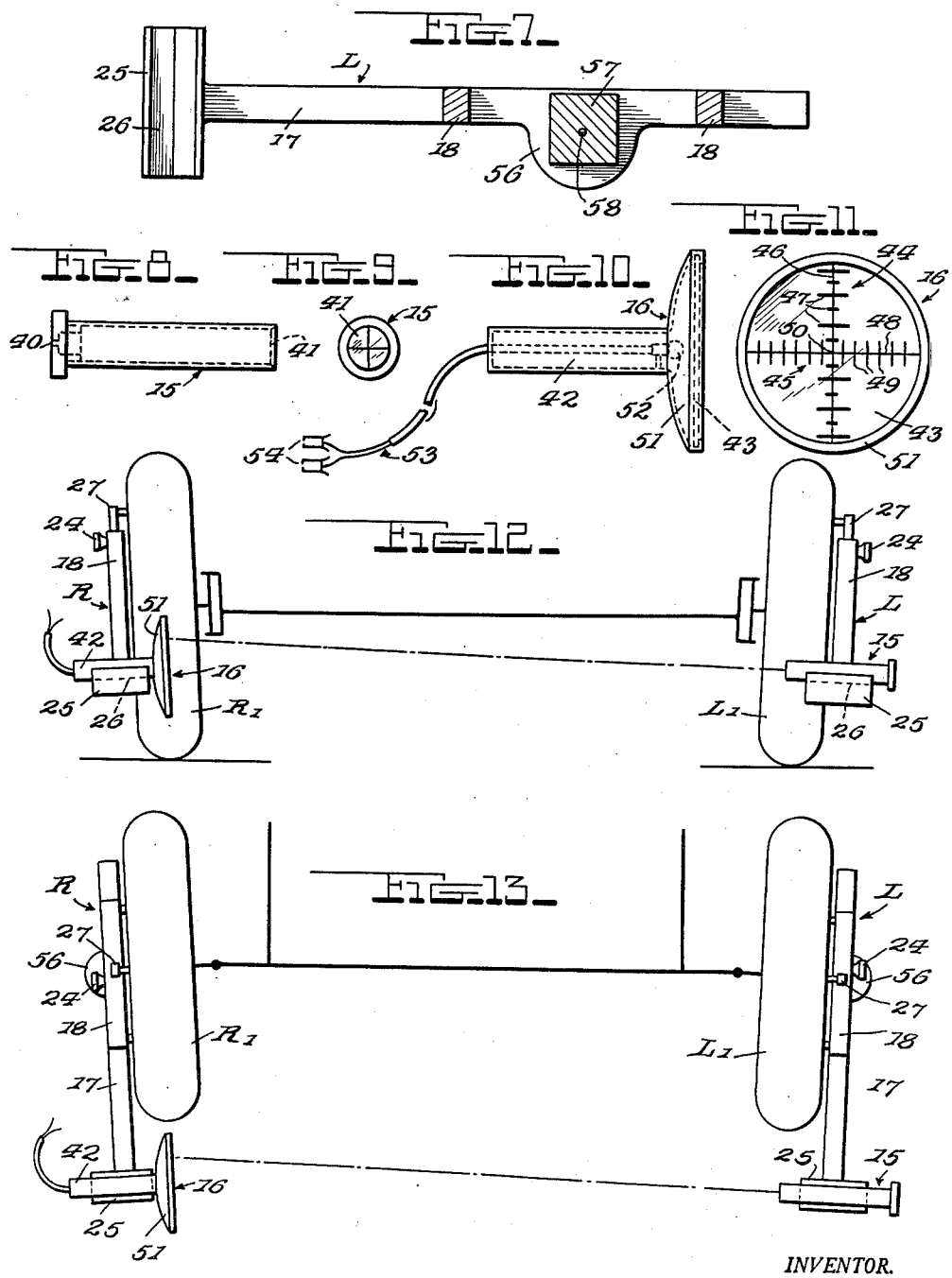
INVENTOR.
Edward D. Wilkerson
BY
Mason, Porter, Diller & Stewart
attys.

United States Patent Office 3,081,546
Patented Mar. 19, 1963

3,081,546
WHEEL ALIGNMENT TESTING MEANS
AND METHOD
Edward D. Wilkerson, 280 E. Northfield, Livingston, N.J.
Filed Mar. 9, 1955, Ser. No. 493,106
9 Claims. (Cl. 33—46)

This invention relates to the testing of the front wheels of motor vehicles to check wheel alignment; and it embodies both a novel method and a novel apparatus for use in carrying out that method.

The apparatus is of the general type in which a sighting device and a target are cooperatively mounted on the vehicle front wheels respectively, scales on the target being readable by sighting through the sighting device. An apparatus of this general type is disclosed in my U.S. Patent No. 2,689,403 of September 21, 1954, over which the present invention constitutes an important simplification and improvement.

In the patented structure, when testing toe-in, the sighting device occupied a position near the plane of the surface on which the vehicle was supported, whereas for testing camber and caster said sighting device occupied a position greatly above said plane. This required that the operator descend into a pit to check toe-in, if testing were being done with the car supported on a floor, and required that he climb from the pit to check camber and caster. Furthermore if testing were being done with the vehicle elevated on a hoist or rack instead of floor-supported, while toe-in could be checked with the operator standing on the floor, the use of a ladder was necessary to enable him to check camber and caster. Also, in the patented structure, one setting of the apparatus with respect to the wheels was necessary for testing toe-in (to position the sighting device and target in advance of the wheels) and another setting was required for testing camber and caster (to position the sighting device and target above the wheels). All of this was quite inconvenient and time consuming and the present invention aims to overcome such prior difficulties.

In carrying out the above end, the principal object of the invention is to provide for the successive checking of toe-in and camber with one setting of the supports for the sighting device and target, with which setting the sighting device is positioned at the operator's eye level when he either stands in a pit below a floor supporting the vehicle, or stands on the floor with the vehicle elevated upon a hoist or rack.

This successive checking of toe-in and camber with one setting of the supports for the sighting device and target, requires that said setting device and target be interchangeably mounted on said supports, for reasons hereinafter explained: and another object is to provide simple and effective means expeditiously permitting the required interchange.

Still another object is to provide new and improved means for fixedly mounting the supports for the sighting device and target upon the vehicle wheels, said mounting means including three elements to engage the inner periphery of the wheel rim lip at circumferentially spaced points, two of said elements being fixed while the third is adjustably mounted and provided with a convenient knob or the like for applying and releasing it.

A further object is to make novel provision whereby rotation of the aforesaid knob or the like will first force the adjustably mounted rim-lip-engaging element into tight engagement with the rim lip and will then lock said element.

A still further object is to provide the rim-lip-engaging elements of novel form to insure proper positioning of the two supports with respect to the wheel rims and to insure anti-slipping engagement of said elements with the lips of the rims.

Another object of the invention is to provide novel means for checking caster without the use of the sighting device and target.

Yet another object is to provide a novel and simple method for checking toe-in and camber, whether said method be carried out with the aid of the present apparatus or some other means.

A preferred means for attaining the desired ends is shown in the accompanying drawings.

FIGURE 1 is a side elevation showing the left wheel-engaging support which is used in mounting either the sighting device or the target upon the left front wheel of a vehicle, the latter being shown upon a hoist.

FIGURE 2 is a detail sectional view on line 2—2 of FIGURE 1 showing one of the fixed rim-lip-engaging elements.

FIGURE 3 is a vertical sectional view on line 3—3 of FIGURE 1 showing the adjustably mounted rim-lip-engaging element and its operating means.

FIGURE 4 is a vertical sectional view on line 4—4 of FIGURE 3.

FIGURE 5 is an enlarged side elevation of the caster testing means shown below the wheel center in FIGURE 1.

FIGURE 6 is a vertical sectional view on line 6—6 of FIGURE 5.

FIGURE 7 is a horizontal sectional view on line 7—7 of FIGURE 1.

FIGURES 8 and 9 are respectively a side elevation and an end elevation of the sighting device.

FIGURES 10 and 11 are respectively a side elevation and a face view of the target.

FIGURE 12 is an exaggerated diagrammatic front elevation showing the testing means applied to the wheels.

FIGURE 13 is a top plan of FIGURE 12.

The construction shown in the drawings will be rather specifically described, but it is to be understood that variations may well be made within the scope of the invention.

Two frames L and R are provided to be mounted at the outer sides of the two front wheels $L^1$ and $R^1$ of a motor vehicle, to interchangeably mount a sighting device 15 and a target 16 upon said wheels, in cooperable relation with each other. Both frames L and R are of the same construction and a description of one (L) will therefore suffice.

This frame L comprises a horizontal bar 17 and an arched bar 18 over the rear portion of said horizontal bar, the legs of said arched bar being suitably joined to said horizontal bar. The inner sides of these legs are provided with two fixed mounting elements 19 and 20 respectively, to engage the lip 21 of the wheel rim 22. At the upper end of the arched bar 18, a third mounting element 23 is adjustably connected with said bar 18 for engagement with the lip 21. A knob 24 is so associated with the adjustably mounted element 23 as to be useable for moving this element 23 to and from engagement with the rim lip 21 and for locking said element 23 in lip-engaging position, as hereinafter described. Thus, the frame L may be quickly and easily secured to the wheel.

The horizontal bar 17 is relatively short compared to the more or less corresponding "posts" of the patented structure above discussed and said bar 17 is preferably of only such length as to extend forwardly under the front bumper and adjacent fender portions of a motor vehicle when the frame L is mounted on the wheel. The front end of this bar 17 is provided with an elongated head 25. This head is rigidly joined to the front end of the bar 17 and disposed horizontally at a right angle to said bar 17. The upper side of the head 25 is formed with a longitudinal V-groove 26 providing a seat for accurately supporting either the sighting device 15 or the target 16, as more fully explained later.

It was stated above that the knob 24 was operable to move the lip-engaging element 23 into and from engagement with the rim lip 21 and to lock said element in lip-engaging position. The novel structure by means of which this is made possible, will now be described.

The element 23 is secured to the upper end of a short rack bar 27 (FIGURES 1 and 3), said rack bar being slidably mounted in a guideway 28 extending through the upper end of the arched bar 18. A pinion 29 meshes with the teeth of the rack bar 27 and is secured to one end of a short shaft 30. The bar 18 is recessed at 31 to receive the pinion 29 and is formed with a bearing opening 32 through which the shaft 30 extends. The knob 24 is rather loosely threaded at 33 upon the shaft 30, and a spring 34 establishes a yieldable driving connection from said knob to said shaft, said spring being preferably of spiral form and being housed in a recess 35 in the knob 24.

Turning of the knob 24 to the left causes the spring 34 to turn the pinion shaft 30 in a direction to lower the rack bar 27, thereby lowering the lip-engaging element 23. Turning of the knob 24 to the right causes the spring 34 to drive the pinion shaft 30 in a direction to raise the rack bar 27. This movement firmly engages the element 23 with the rim lip 21 and also insures similar engagement of the lower elements 19 and 20 with said lip. As soon as the upward movement of the rack bar 27 has been arrested, further turning of the knob 24 (permitted by the spring 34) will cause said knob to act as a nut and lock the shaft 30 in the position to which it has been turned, thus insuring that the elements 19, 20 and 23 shall remain solidly engaged with the rim lip 21.

Each of the elements 19, 20 and 23 is preferably of frusto-conical form (FIGURES 2 and 3) with an integral peripheral flange or shoulder 36 and a mounting stud 37 at its smaller end. The stud 37 is threaded tightly into an opening 38 in the bar 18 or rack bar 27 as the case may be.

By forming the elements 19, 20 and 23 as shown, the flanges or shoulders 36 will abut the edge of the rim lip 21 to locate the frame L in proper relation with the plane of the wheel, and the sharp edges 39 of said elements will bite into said lip sufficiently to prevent slipping. When the lip-engaging portions of the edges 39 have become dulled by repeated use, the studs 37 may be turned sufficiently to present other portions of said edges for use.

The sighting device 15 (FIGURES 8 and 9) is preferably in the form of a hollow cylindrical body having a peep-hole 40 in one end and a crossed-hair lens 41 at its other end. This sighting device, when simply laid in the V-groove 26, will be accurately positioned by the shape of said groove.

The target 16 (FIGURES 10 and 11) which is a combined toe-in and camber target, is provided at its outer side with a shank 42 for reception in the V-groove 26. This target includes a target plate 43 having a camber scale 44 and a toe-in scale 45. The camber scale 44 has a vertical center line 46 and vertically spaced graduations 47. The toe-in scale 45 has a horizontal center line 48 and horizontally spaced graduations 49. The two center lines 46 and 48 cross as a zero point 50.

The target plate 43 is preferably translucent and held by a reflector 51 containing an illuminating bulb 52. Suitable wiring 53 is shown for this bulb, said wiring having clips 54 for engagement with the battery terminals of a motor vehicle whose "front end" is being tested.

The structure so far described is operable to check both camber and toe-in as hereinafter fully explained. For checking caster, however, special mechanisms are provided which utilize the frames L and R as mounting means but do not require use of the sighting device 15 and target 16. There are two of these mechanisms, one mounted on the bar 17 of the frame L and the other on the corresponding bar of the frame R. The two mechanisms are of identical construction and only one is shown, generally designated at 55 in FIGURES 1, 5 and 6 to which reference is now made.

The bar 17 is provided with an outwardly projecting shelf 56 upon which a housing 57 is mounted by means of a screw 58 or in some other adequate manner. Mounted in this housing 57 in a position to extend longitudinally over the bar 17, is a shaft 59. One end of this shaft 59 projects from the housing 57 and carries a leveling device 60 which is preferably in the form of a spirit level mounted in a head 61 secured to said shaft, said spirit level being disposed at a right angle to the shaft 59. The other end of this shaft 59 is provided with a worm gear 62 within the housing 57.

A transverse shaft 63 is mounted in the housing 57 below the shaft 59 and is provided with a worm 64 meshing with the form gear 62. One end of the shaft 63 projects beyond the outer side of the housing 57 and a hub 65 is secured to said projecting shaft end in any suitable manner. This hub 65 carries a dial plate 66 having an arcuate positive caster scale 67 and an arcuate negative caster scale 68. These scales are cooperable with a fixed indicator pin 69 carried by the housing 57 and this pin may also co-act with a stop lug 70 on the dial plate 66 to limit rotation of the latter.

The transverse shaft 63 is tubular and a rod 71 extends longitudinally through said shaft. This rod is threaded adjustably through the front portion of the hub 65 as shown at 72 and the outer end of said rod is provided with a knob 73. The inner end of the rod 71 abuts an end-thrust bearing 74 within the housing 57.

A spiral spring 75 is provided to rotatively bias the shaft 59 in one direction (counterclockwise in FIG. 6). In the present instance, this spring 75 is connected at one end with the worm gear 62 and at its other end to the housing 57. This spring 75 exerts a force through the worm gear 62 and worm 64 tending to shift the tubular shaft 63 toward the thrust bearing 74 but such force is normally resisted by the rod 71 abutting said thrust bearing. This force is permitted to act, however, if the rod 71 be turned counterclockwise by means of its knob 73. Then, as the shaft 63 moves inwardly under the influence of the spring 75, this spring 75 also turns the shaft 59 counterclockwise. If the rod 71 be turned clockwise by means of the knob 73, the tubular shaft 63 is caused to move away from the thrust bearing 74. The worm 64 and worm gear 62 then act as a common rack and gear, respectively, and turn the shaft 59 clockwise. A very sensitive adjustment is thus provided for initially leveling the leveling device 60 when making a caster test. During this test, at a time hereinafter explained, the dial plate 66 is turned by hand, causing the worm 64 to turn the gear 62 to again level the leveling device 60.

The housing 57 carries a rigidly mounted spirit level 76 (FIGURE 6) which is instrumental in leveling the bar 17 of the frame L or R when initially mounting said frame on the vehicle wheel. Such leveling is necessary in order that camber, toe-in, or caster may be accurately checked.

Camber and toe-in are checked with a single setting of the frames L and R on the vehicle wheels and in these tests the sighting device 15 and target 16 are used, as explained under the heading "Toe-In Test and Camber Test." In checking caster, however, the mechanisms 55 are used without using the sighting device 15 and target 16, as explained under the heading "Caster Test."

*Toe-In Test and Camber Test*

The two frames L and R are mounted on the vehicle wheels $L^1$ and $R^1$ respectively, the spirit tube 76 (FIG. 6) being used to level the arms 17. The sighting device 15 is placed in the V-groove 26 of the left frame L (for example) and the shank 42 of the target 16 is placed in the V-groove of the right frame R, making certain that the camber scale 44 is disposed vertically. The operator now sights through the sighting device 15 and cuts the front wheels until the center line 46 through the zero point 50 of the target 16 is visible, which indicates that the toe-in of the left front wheel has been brought to zero. The operator now reads the camber scale 44 and thus determines the camber of the left wheel. Now, the sighting device 15 and target 16 are interchanged. Again sighting through the device 15, the operator determines the toe-in of the wheels by simply reading the toe-in scale 45. Also, the camber of the right wheel is now determined by reading the scale 44. The toe-in and camber tests thus embrace the method steps of interchangeably mounting the sighting device and the combined toe-in and camber target upon the two front wheels respectively, utilizing the sighting device and target to read the camber of the wheel carrying the sighting device, interchanging the sighting device and target and disposing them at the same level as before, and utilizing said sighting device and target to successively read both the camber of the other wheel and the toe-in of the wheels. With the vehicle elevated on a hoist or rack or the operator standing in a pit, the sighting operations are performed while the operator stands at a single level, first at one side of the vehicle and then at the other.

*Caster Test*

The caster test for one wheel will be explained and all operations embraced in said test are duplicated for the other wheel. To test the caster of the left wheel, for example, this wheel is cut to the right to a known degree and the dial plate 66 is turned to zero. The leveling device 60 is now brought to level position by turning the knob 73. The wheel is now cut to the left to a known degree. The leveling device 60 is now again brought to level position, this time by turning the dial plate 66. The amount of positive or negative caster is now determined by reading the scale 67 or 68 (whichever is then adjacent the indicator pin 69) at said pin 69.

From the foregoing, it will be seen that novel and advantageous provision has been made for attaining the desired ends. However, attention is again invited to the possibility of making variations within the scope of the invention.

I claim:

1. In a front wheel alignment testing means, two supporting members, means for mounting said supporting members on the front wheels of a vehicle respectively, said supporting members having front portions which project forwardly from the wheels when said supporting members are mounted, a sighting device and a cooperating target, said target having a vertical camber scale and a horizontal toe-in scale, and means for interchangeably mounting said sighting device and said target in cooperative relation on said projecting portions of said supporting members; whereby both camber and toe-in may be tested with said sighting device disposed at a single level.

2. A structure as specified in claim 1, said means for interchangeably mounting said sighting device and target comprising two seats on the front ends of said supporting members respectively, said sighting device and target having portions cooperable with said seats respectively for cooperatively relating said sighting device and target.

3. A structure as specified in claim 1, said means for interchangeably mounting said sighting device and target comprising the elongated V-shaped seats on the front ends of said supporting members respectively, said sighting device being horizontally elongated and receivable in either of said seats, said target having a horizontally elongated shank also receivable in either of said seats.

4. In a front wheel alignment testing means, a supporting member and means for mounting said supporting member on one front wheel of a vehicle in an elevated wheel supported position, said supporting member having a front end which projects only a short distance forwardly from the wheel when said supporting member is mounted, said projecting front end of said supporting member having an elongated transversely extending freely upwardly opening seat with a longitudinal axis disposed normal to the plane of the wheel and in which to receive and accurately position selectively a sighting device and a target resting in said seat by gravity action with the axis of the sighting device normal to the plane of the wheel.

5. A structure as specified in claim 4, said seat being of V-shape transversely of its length.

6. In a method of testing camber and toe-in of front vehicle wheels in a single series of operations with the aid of a sighting device and a cooperating target, the steps of interchangeably mounting the sighting device and target on the two wheels respectively, with the axis of the sighting device disposed normal to the plane of the respective wheel, utilizing said sighting device and target in a first position to perform part of both the camber and toe-in testing operation, interchanging the sighting device and target and disposing them in a second position at the same level as before and with the axis of the sighting device disposed normal to the plane of the respective wheel, and utilizing the interchanged sighting device and target to complete the camber and toe-in tests.

7. In a method of testing camber and toe-in of front vehicle wheels in a single series of operations with the aid of a sighting device and a cooperating target, the steps of interchangeably mounting the sighting device and target on the two wheels respectively with the axis of the sighting device disposed normal to the plane of the respective wheel, utilizing said sighting device and target in a first position to determine the camber of the wheel carrying the sighting device, interchanging said sighting device and target and disposing them in a second position at the same level as before and with the axis of the sighting device disposed normal to the plane of the respective wheel, and utilizing the interchanged sighting device and target to successively determine the camber of the other wheel and the toe-in of the wheels.

8. In a method of testing camber and toe-in of front vehicle wheels in a single series of operations with the aid of a sighting device and a cooperating target, the steps of interchangeably mounting the sighting device and target on the two wheels respectively with the axis of the sighting device disposed normal to the plane of the respective wheel, with the aid of the sighting device and target cutting the wheels until the one wheel carrying the sighting device is disposed at zero toe-in, and with said sighting device and target in this relative position utilizing said sighting device and target to determine the camber of said one wheel, interchanging the sighting device and target and disposing them at the same level as before and with the axis of the sighting device disposed normal to the plane of the respective wheel, and with said sighting device and target in this second relative position utilizing the interchanged sighting device and target to successively determine the camber of the other wheel and the toe-in of the wheels.

9. In a front wheel alignment testing means, a supporting member, a projectable and retractible member mounted on said supporting member and having a rim-lip-engaging element, operating and locking means for said projectable and retractible member, said supporting member having a front end which projects only a short distance forwardly from the wheel when said supporting member is mounted, said projecting front end of said supporting member having a transversely elongated upwardly opening seat means for accurately supporting a cylindrical testing member portion by gravity action for rotation about its axis and with the axis of the testing member portion disposed normal to the plane of the wheel.

References Cited in the file of this patent

UNITED STATES PATENTS

| | | |
|---|---|---|
| 2,285,281 | Johnson | June 2, 1942 |
| 2,380,501 | Christian et al. | July 31, 1945 |
| 2,402,041 | Greenleaf et al. | June 11, 1946 |
| 2,475,502 | Holmes | July 9, 1949 |
| 2,554,621 | Jacobsen et al. | May 29, 1951 |
| 2,569,416 | Jacobsen | Sept. 25, 1951 |
| 2,575,194 | Smith | Nov. 13, 1951 |
| 2,586,194 | Wochner | Feb. 19, 1952 |
| 2,624,123 | Wilkerson | Jan. 6, 1953 |
| 2,689,403 | Wilkerson | Sept. 21, 1954 |

FOREIGN PATENTS

| | | |
|---|---|---|
| 706,333 | France | Mar. 30, 1931 |
| 535,330 | Great Britain | Apr. 7, 1941 |